United States Patent
Klipper et al.

(10) Patent No.: US 6,329,435 B1
(45) Date of Patent: Dec. 11, 2001

(54) PROCESS FOR PREPARING MONODISPERSE, CROSSLINKED BEAD POLYMERS HAVING THIOUREA GROUPS AND THEIR USE FOR ADSORBING METAL COMPOUNDS

(75) Inventors: Reinhold Klipper, Köln; Werner Strüver; Ulrich Schnegg, both of Leverkusen; Heiko Hoffmann, Bergisch; Dieter Mauer, Leverkusen; Bernhard Lehmann, Aachen; Bruno Hees, Langenfeld; Holger Lütjens, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/643,078

(22) Filed: Aug. 21, 2000

(30) Foreign Application Priority Data

Aug. 27, 1999 (DE) .................................................. 19940865
Aug. 27, 1999 (DE) .................................................. 19954402

(51) Int. Cl.$^7$ .................................. C08F 8/34; C08F 8/30
(52) U.S. Cl. .................................. 521/33; 521/30; 521/31; 521/32; 521/33; 525/352; 525/375; 525/383
(58) Field of Search ...................... 521/33, 32; 525/358, 525/375, 383

(56) References Cited

U.S. PATENT DOCUMENTS

| | | |
|---|---|---|
| 2,418,941 | 4/1947 | Izard et al. . |
| 3,006,866 * | 10/1961 | Corte . |
| 3,586,646 | 6/1971 | Corte et al. . |
| 3,716,482 | 2/1973 | Corte ...................................... 210/37 |
| 3,790,535 | 2/1974 | Motani et al. . |
| 3,847,841 | 11/1974 | Motani et al. . |
| 3,882,053 | 5/1975 | Corte et al. . |
| 3,892,689 | 7/1975 | Motani et al. . |
| 3,994,719 * | 11/1976 | Corte . |
| 4,382,124 | 5/1983 | Meitzner et al. ....................... 521/38 |
| 4,419,245 | 12/1983 | Barrett et al. ......................... 210/681 |
| 4,427,794 | 1/1984 | Lange et al. ............................ 521/28 |
| 4,444,961 | 4/1984 | Timm ..................................... 526/88 |
| 4,952,608 * | 8/1990 | Klipper .................................. 521/32 |
| 5,231,115 | 7/1993 | Harris ..................................... 521/28 |

FOREIGN PATENT DOCUMENTS

| | | |
|---|---|---|
| 24 29 994 | 2/1976 | (DE) . |
| 2429944 | 8/1977 | (DE) . |
| 212256 | 8/1984 | (DE) . |
| 224038 | 6/1985 | (DE) . |
| 0 422 480 | 4/1991 | (EP) . |
| 547 720 | 6/1993 | (EP) . |
| 86/05499 | 9/1986 | (WO) . |

OTHER PUBLICATIONS

Christian Vater, Jae–Ho An und Martin Jekel, Wasser, Abwasser, 132, 1991, Nr. 10, pp. 565–571, Reinigung von Abwässern aus Rauchgaswäschern mit chelatbildenden Ionenaustauschern.

* cited by examiner

Primary Examiner—Fred Zitomer
(74) Attorney, Agent, or Firm—Joseph C. Gil; Richard E. L. Henderson

(57) ABSTRACT

The present invention relates to a process for preparing novel, monodisperse crosslinked bead polymers having thiourea groups and their use for adsorbing metal compounds, in particular heavy metal compounds or noble metal compounds.

15 Claims, No Drawings

PROCESS FOR PREPARING MONODISPERSE, CROSSLINKED BEAD POLYMERS HAVING THIOUREA GROUPS AND THEIR USE FOR ADSORBING METAL COMPOUNDS

BACKGROUND OF THE INVENTION

The present invention relates to a process for preparing novel, monodisperse crosslinked bead polymers having thiourea groups, and to their use for adsorbing metal compounds, in particular heavy metal compounds or noble metal compounds.

U.S. Pat. No. 4,444,961 discloses a process for preparing monodisperse, macroporous chelate resins. In this process, haloalkylated polymers are aminated and the aminated polymer is reacted with chloroacetic acid to give chelate resins of the iminodiacetic acid type.

The subject of the present invention is previously unknown monodisperse bead polymers, in particular monodisperse chelate resins functionalized with thiourea groups, a process for their preparation, and also their use.

Surprisingly, the monodisperse chelate resins having thiourea groups have a markedly higher adsorption capacity for metal compounds, in particular compounds of heavy metals or noble metals, than do the monodisperse, macroporous chelate resins disclosed in U.S. Pat. No. 4,444,961. A result of this is an improvement in the leakage behavior within the resin, reducing the amounts of metal residues in the eluate. The improved adsorption capability for heavy metal compounds and noble metal compounds is particularly apparent with elements of the platinum group, with bivalent ions from aqueous salt solutions or acids, in particular with noble metals such as rhodium, gold or silver, or noble-metal-containing catalyst residues.

However, the novel chelate resins can do more than merely purify aqueous salt solutions and acids with respect to metal residues. The novel chelate resins are also used in organic solvents or solutions of liquid or gaseous hydrocarbons or halogenated hydrocarbons, in particular chlorinated or fluorinated hydrocarbons.

To remove metal ions from liquid solutions, use is made industrially of ion exchangers that selectively adsorb these ions and are known as selective resins.

The treatment of process streams and waste water, specifically from the electroplating and surface finishing industry but also from the chemical and electronics industries, continues to increase in significance. It is an important precondition for the continued existence of numerous plants.

A central issue in the treatment of these aqueous or organic waste liquids, as well as in the treatment of landfill run-off and groundwater, is very extensive removal of metal ions, in particular heavy metal ions, such as those of mercury, iron, copper, nickel, and arsenic, or at least their removal down to very low residual concentrations.

Wet flue gas scrubbing in waste incineration plants or coal-fired power stations produces salt-rich waste water that contain considerable quantities of heavy metal ions. Modern incineration plants operate with two-stage scrubbing for separate adsorption of hydrochloric acid at pH<1 and $SO_2$ in the alkaline region. See C. Vater, J. An, and M. Jekel, *Wasser, Abwasser* 132, 565–571 (1991).

Acid scrubbers produce solutions containing hydrochloric acid, that are contaminated by a number of heavy metals. The hydrochloric acid solution from the scrubber contains mercury ions. Since in many cases it is desirable to obtain hydrochloric acid from the flue gas scrubber effluent, mercury must be very substantially removed therefrom. The macroporous, heterodisperse bead polymers used hitherto for this and having thiourea groups, disclosed in DE-A 2,429,944, have insufficient capability for the task. There is therefore a need for novel polymers with improved properties. In such cases the novel polymers functionalized with thiourea groups have an excellent purification action.

EP-A 422,480 describes a process for partial removal of trace elements from hydrocarbon mixtures using heterodisperse bead polymers having thiourea groups.

However, it is also known that heavy metals and their compounds occur not only in aqueous systems but also in the natural environment in many organic liquids and gases. For example, natural gases and natural gas condensates, mineral oils, and liquid or gaseous hydrocarbons in general, if they come from fossil sources, contain heavy metals and their compounds, for example, mercury, iron, nickel, phosphorus, arsenic, and others.

The petrochemical industry uses a large number of different process stages for the further processing of mineral oils and natural gases from various points of origin.

These stages include, inter alia, distillation steps, steam cracking or catalytic cracking and hydrogenation.

Use is frequently made in these processes of catalysts based on noble metals, inter alia platinum, palladium, and rhodium.

The action of these catalysts is to a considerable extent dependent on the absence of other metal or heavy metal compounds, for example, arsenic or mercury compounds. The presence of these substances can dramatically impair the action of the catalysts and poison the same. The term catalyst poisons is used.

Mercury is a corrosive metal that generally has a corroding action in pipelines and equipment due to amalgam formation and can bring about considerable corrosion damage.

There is therefore also a need to remove metal and/or heavy metal compounds from hydrocarbon mixtures. The macroporous, heterodisperse bead polymers used hitherto for this purpose and containing thiourea groups do not have sufficient capability for the task. The novel monodisperse polymers containing thiourea groups show markedly improved properties in this respect.

For recycling mercury from the waste water from alkali metal chloride electrolysis and purifying this waste water, use is made of combinations of anion exchangers and macroporous, heterodisperse bead polymers containing thiourea groups. According to DE-A 2,249,472, the latter polymer is used for ultrapurification.

For this application, too, the novel monodisperse polymers containing thiourea groups have improved properties. These markedly reduce heavy metals and their compounds not only in aqueous solutions but also, as described above, in organic liquids and vapors.

SUMMARY OF THE INVENTION

The present invention therefore provides a process for preparing monodisperse ion exchangers having thiourea groups comprising
(a) reacting monomer droplets made from at least one monovinylaromatic compound and at least one polyvinylaromatic compound, together, if desired, with a porogen (pore former) and/or with an initiator or an initiator combination to give a monodisperse, crosslinked bead polymer, (b) amidomethylating the monodisperse, crosslinked bead polymer from step (a) with phthalimide derivatives, (c) converting the amidomethylated bead polymer from step (b) to an aminomethylated bead polymer, and (d) reacting the aminomethylated bead polymer from step (c) with thiourea, with substituted thiourea, or with salts of thiocyanic acid.

DETAILED DESCRIPTION OF THE INVENTION

Surprisingly, the monodisperse, crosslinked bead polymers containing thiourea groups and prepared according to the present invention exhibit, when compared with polymers known from the prior art, markedly improved removal of heavy metals and noble metals from aqueous solutions or organic liquids or their vapors, particularly of mercury from aqueous solutions of alkaline earth metals or alkali metals, in particular removal of mercury from saline solutions from alkali metal chloride electrolysis, markedly improved removal of heavy metals, in particular mercury and arsenic, from aqueous hydrochloric acids, in particular from flue gas scrubber effluent, but also from landfill run-off or groundwater, markedly improved removal of heavy metals, in particular mercury and arsenic, and of noble metals, from liquid or gaseous hydrocarbons, such as natural gases, natural gas condensates, or mineral oils, or from halogenated hydrocarbons, such as chloro- or fluorohydrocarbons, markedly improved removal of elements of the platinum group, as well as gold or silver, from aqueous or organic solutions, and markedly improved removal of rhodium or elements of the platinum group, as well as gold or silver, or rhodium-containing or noble-metal-containing catalyst residues from organic solutions or solvents.

The monodisperse bead polymers of the invention containing thiourea groups are thus outstandingly suitable for diverse applications in the chemical, electronics, waste disposal/recycling, electroplating, or surface finishing industry.

The monodisperse, crosslinked vinylaromatic base polymer according to process step (a) may be prepared by the processes known from the literature. Processes of this type are described, for example, in U.S. Pat. No. 4,444,961, EP-A 46,535, U.S. Pat. No. 4,419,245, or WO 93/12167, the contents of which are incorporated into the present application by way of reference in relation to process step (a).

In process step (a), at least one monovinylaromatic compound and at least one polyvinylaromatic compound are used. However, it is also possible to use mixtures of two or more monovinylaromatic compounds and mixtures of two or more polyvinylaromatic compounds.

Preferred monovinylaromatic compounds for the purposes of the present invention in process step (a) are monoethylenically unsaturated compounds, such as styrene, vinyltoluene, ethylstyrene, α-methylstyrene, chlorostyrene, chloromethylstyrene, alkyl acrylates, and alkyl methacrylates. Particular preference is given to the use of styrene or mixtures of styrene with the above-mentioned monomers.

Preferred polyvinylaromatic compounds for the purposes of the present invention for process step (a) are multifunctional ethylenically unsaturated compounds, such as divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate, or allyl methacrylate.

The amounts used of the polyvinylaromatic compounds are generally from 1 to 20% by weight (preferably from 2 to 12% by weight, particularly preferably from 4 to 10% by weight), based on the monomer or its mixture with other monomers. The nature of the polyvinylaromatic compounds (crosslinking agents) is selected with the subsequent use of the spherical polymer in mind. In many cases divinylbenzene is suitable. For most uses, commercial grades of divinylbenzene are sufficient, and comprise ethylvinylbenzene besides the divinylbenzene isomers.

In one preferred embodiment of the present invention, microencapsulated monomer droplets are used in process step (a).

Possible materials for the microencapsulation of the monomer droplets are those known for use as complex coacervates, in particular polyesters, natural or synthetic polyamides, polyurethanes, and polyureas.

An example of a particularly suitable natural polyamide is gelatin, which is used in particular as coacervate and complex coacervate. For the purposes of the present invention, gelatin-containing complex coacervates are primarily combinations of gelatin with synthetic polyelectrolytes. Suitable synthetic polyelectrolytes are copolymers incorporating units of, for example, maleic acid, acrylic acid, methacrylic acid, acrylamide, or methacrylamide. Particular preference is given to the use of acrylic acid and acrylamide. Gelatin-containing capsules may be hardened using onventional hardeners, such as formaldehyde or glutaric dialdehyde. The ncapsulation of monomer droplets with gelatin, with gelatin-containing coacervates and with gelatin-containing complex coacervates is described in detail in EP-A 46,535. The methods for encapsulation using synthetic polymers are known. An example of a highly suitable process is interfacial condensation, in which a reactive component dissolved in the monomer droplet (for example, an isocyanate or an acid chloride) is reacted with a second reactive component (for example, an amine) dissolved in the aqueous phase.

The monomer droplets, which may be microencapsulated if desired, may, if desired, contain an initiator or mixtures of initiators to initiate the polymerization. Examples of initiators suitable for the novel process are peroxy compounds, such as dibenzoyl peroxide, dilauroyl peroxide, bis(p-chlorobenzoyl)peroxide, dicyclohexyl peroxydicarbonate, tert-butyl peroctoate, tert-butyl peroxy-2-ethylhexanoate, 2,5-bis(2-ethylhexanoyl-peroxy)-2,5-dimethylhexane, and tert-amylperoxy-2-ethylhexane, and azo compounds, such as 2,2'-azobis(isobutyronitrile) and 2,2'-azobis(2-methylisobutyronitrile).

The amounts used of the initiators are generally from 0.05 to 2.5% by weight (preferably from 0.1 to 1.5% by weight), based on the mixture of monomers.

To create a macroporous structure in the spherical polymer it is possible, if desired, to use porogens as other additives in the optionally microencapsulated monomer droplets. Suitable compounds for this purpose are organic solvents which are poor solvents and, respectively, swelling agents with respect to the polymer produced. Examples that may be mentioned are hexane, octane, isooctane, isododecane, methyl ethyl ketone, butanol, and octanol and isomers thereof.

The concepts "microporous" or "gel" and "macroporous" have been described in detail in the technical literature.

Bead polymers preferred for the purposes of the present invention and prepared in process step (a) have a macroporous structure.

Substances that are monodisperse for the purposes of the present application are those for which the diameter of at least 90% by volume or by weight of the particles varies from the most frequent diameter by not more than ±10% of the most frequent diameter.

For example, in the case of a substance with a most frequent diameter of 0.5 mm, at least 90% by volume or by weight have a size range from 0.45 mm to 0.55 mm, and in the case of a substance with a most frequent diameter of 0.7 mm, at least 90% by volume or by weight have a size range from 0.77 mm to 0.63 mm.

Monodisperse macroporous bead polymers may be produced, for example, by adding inert materials (porogens) to the monomer mixture during the polymerization. Suitable substances of this type are primarily organic substances that dissolve in the monomer but are poor solvents and, respectively, swelling agents for the polymer (precipitants for polymers), for example, aliphatic hydrocarbons (Farbenfabriken Bayer DBP 1045102, 1957; DBP 1113570, 1957).

U.S. Pat. No. 4,382,124, for example, uses alcohols having from 4 to 10 carbon atoms as porogen for preparing monodisperse, macroporous bead polymers based on styrene/divinylbenzene. An overview of preparation methods for macroporous bead polymers is also given.

The monomer droplets, which may be microencapsulated if desired, may also, if desired, comprise up to 30% by weight (based on the monomer) of crosslinked or non-crosslinked polymer. Preferred polymers derive from the above-mentioned monomers, particularly preferably from styrene.

The average particle size of the monomer droplets, which may be encapsulated if desired, is from 10 to 1000 $\mu$m, preferably from 100 to 1000 $\mu$m. The novel process is also very suitable for preparing monodisperse spherical polymers.

When monodisperse bead polymers are prepared according to process step (a) the aqueous phase may, if desired, comprise a dissolved polymerization inhibitor. Both inorganic and organic substances are possible inhibitors for the purposes of the present invention. Examples of inorganic inhibitors are nitrogen compounds, such as hydroxylamine, hydrazine, sodium nitrite, and potassium nitrite, salts of phosphorous acid, such as sodium hydrogenphosphite, and sulfur-containing compounds, such as sodium dithionite, sodium thiosulfate, sodium sulfite, sodium bisulfite, sodium thiocyanate, and ammonium thiocyanate. Examples of organic inhibitors are phenolic compounds, such as hydroquinone, hydroquinone monomethyl ether, resorcinol, pyrocatechol, tert-butylpyrocatechol, pyrogallol, and condensation products made from phenols with aldehydes. Other suitable organic inhibitors are nitrogen-containing compounds, including hydroxylamine derivatives, such as N,N-diethylhydroxylamine, N-isopropylhydroxylamine, and sulfonated or carboxylated derivatives of N-alkylhydroxylamine or of N,N-dialkylhydroxylamine, hydrazine derivatives, such as N,N-hydrazinodiacetic acid, nitroso compounds, such as N-nitrosophenylhydroxylamine, the ammonium salt of N-nitrosophenylhydroxylamine, or the aluminum salt of N-nitrosophenylhydroxylamine. The concentration of the inhibitor is from 5 to 1000 ppm (based on the aqueous phase), preferably from 10 to 500 ppm, particularly preferably from 10 to 250 ppm.

As mentioned above, the polymerization of the optionally microencapsulated monomer droplets to give the spherical monodisperse bead polymer may, if desired, take place in the presence of one or more protective colloids in the aqueous phase. Suitable protective colloids are natural or synthetic water-soluble polymers, such as gelatin, starch, polyvinyl alcohol, polyvinylpyrrolidone, polyacrylic acid, polymethacrylic acid, or copolymers made from (meth)acrylic acid and from (meth)acrylates. Other very suitable materials are cellulose derivatives, particularly cellulose esters and cellulose ethers, such as carboxymethylcellulose, methylhydroxyethylcellulose, methylhydroxypropylcellulose, and hydroxyethylcellulose. Gelatin is particularly suitable. The amount used of the protective colloids is generally from 0.05 to 1% by weight (preferably from 0.05 to 0.5% by weight), based on the aqueous phase.

The polymerization to give the spherical, monodisperse, macroporous bead polymer in process step (a) may, if desired, also be carried out in the presence of a buffer system. Preference is given to buffer systems that set the pH of the aqueous phase at the beginning of the polymerization to between 14 and 6 (preferably between 12 and 8). Under these conditions protective colloids having carboxylic acid groups are present to some extent or entirely in the form of salts, which has a favorable effect on the action of the protective colloids. Buffer systems that are particularly suitable for the purposes of the present invention comprise phosphate salts or borate salts. For the purposes of the present invention, the terms phosphate and borate include the condensation products of the ortho forms of the corresponding acids and salts. The concentration of the phosphate or borate in the aqueous phase is from 0.5 to 500 mmol/l, preferably from 2.5 to 100 mmol/l.

The stirring speed during the polymerization is relatively non-critical and, unlike in conventional bead polymerization, has no effect on the particle size. The stirring speeds used are low speeds which are sufficient to keep the monomer droplets in suspension and to promote dissipation of the heat of polymerization. A variety of stirrer types can be used for this task. Gate stirrers with an axial action are particularly suitable.

The ratio by volume of encapsulated monomer droplets to aqueous phase is from 1:0.75 to 1:20, preferably from 1:1 to 1:6.

The polymerization temperature depends on the decomposition temperature of the initiator used and is generally from 50 to 180° C. (preferably from 55 to 130° C.). The polymerization takes from 0.5 hour to a few hours. It has proven successful to use a temperature program in which the polymerization is begun at a low temperature (for example, 60° C.) and the reaction temperature is raised as the polymerization conversion progresses. This is a very good way of fulfilling, for example, the requirement for a reaction that proceeds reliably and with a high polymerization conversion. After polymerization, the polymer is isolated using conventional methods (for example, by filtration or decanting) and washed if desired.

In process step (b) the amidomethylating reagent is first prepared. This is done, for example, by dissolving a phthalimide or a phthalimide derivative in a solvent and mixing with formalin. A bis(phthalimido) ether is then formed from this material with elimination of water. The bis(phthalimido) ether may, if desired, be reacted to give the phthalimido ester. For the purposes of the present invention, preferred phthalimide derivatives are phthalimide itself and substituted phthalimides such as methylphthalimide.

Solvents used in process step (b) are inert and suitable for swelling the polymer and are preferably chlorinated hydrocarbons, particularly preferably dichloroethane or methylene chloride.

In process step (b) the bead polymer is condensed with phthalimide derivatives. The catalyst used here comprises oleum, sulfuric acid, or sulfur trioxide.

The elimination of the phthalic acid residue, and with this the release of the aminomethyl group, takes place in process step (c) via treatment of the phthalimidomethylated crosslinked bead polymer with aqueous or alcoholic solutions of an alkali metal hydroxide, such as sodium hydroxide or potassium hydroxide, at temperatures of from 100 to 250° C. (preferably from 120 to 190° C.). The concentration of the aqueous sodium hydroxide is from 10 to 50% by weight, preferably from 20 to 40% by weight. This process allows the preparation of crosslinked bead polymers containing aminoalkyl groups with substitution of the aromatic rings at a level greater than 1.

The resultant aminomethylated bead polymer is finally washed with deionized water until free of alkali.

In process step (d) the novel polymers are prepared by reacting the aminomethylated monodisperse, crosslinked vinylaromatic base polymer in suspension with thiourea or with substituted thiourea or with salts of thiocyanic acid. It is particularly preferable to use thiourea or salts of thiocyanic acid.

Mineral acids are used as suspension medium, preferably aqueous hydrochloric acid at concentrations of from 10 to 40% by weight (preferably from 20 to 35% by weight).

The present invention also provides monodisperse bead polymers having thiourea groups and prepared by the novel process.

The novel process preferably gives monodisperse bead polymers having the following functional groups which form during process step (d):

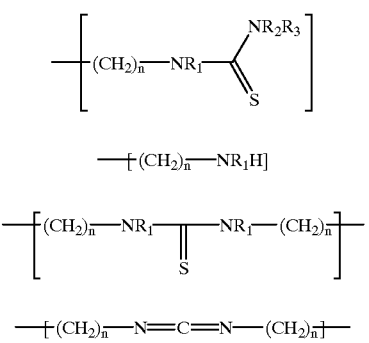

wherein $R_1$ is hydrogen or an alkyl group, $R_2$ is hydrogen or an alkyl group, $R_3$ is hydrogen or an alkyl group, and n is an integer from 1 to 5 (particularly preferably 1).

In the groups $R_1$, $R_2$, and $R_3$, alkyl is preferably in each case $C_1$–$C_6$-alkyl.

In the novel monodisperse bead polymers having thiourea groups each aromatic ring preferably has from 0.1 to 2 of the above-mentioned functional groups (1), (2), (3), or (4).

The proportion of the individual functional groups, based on the total of all of the functional groups, is preferably from 30 to 80% of (1)
from 5 to 30% of (2)
from 1 to 95% of (3)
from 1 to 5% of (4).

The crosslinked bead polymers prepared according to the invention containing thiourea groups are suitable for adsorbing metals, in particular heavy metals or noble metals, or compounds of these, from aqueous solutions or organic liquids. The crosslinked bead polymers containing thiourea groups and prepared according to the invention are particularly suitable for removing heavy metals or noble metals from aqueous solutions, in particular from aqueous solutions of alkaline-earth metals or of alkali metals, from saline solutions from alkali metal chloride electrolysis, from aqueous hydrochloric acids, from waste water or flue gas scrubber effluent, from ground water or landfill runoff water, from liquid or gaseous hydrocarbons, natural gases, natural gas condensates, mineral oils, or from halogenated hydrocarbons, such as chloro- or fluorohydrocarbons or fluorochlorohydrocarbons.

The crosslinked bead polymers containing thiourea groups and prepared according to the invention are very particularly suitable for removing mercury, elements of the platinum group, or gold or silver from the gases, liquids, or solutions listed above.

The novel bead polymers are particularly suitable for removing rhodium, elements of the platinum group, gold, silver, or rhodium-or noble-metal-containing catalyst residues from organic solutions or solvents.

The following examples further illustrate details for the process of this invention. The invention, which is set forth in the foregoing disclosure is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1

1a) Preparation of the Monodisperse Macroporous Bead Polymer Based on Styrene, Divinylbenzene, and Ethylstyrene 3000 g of deionized water were placed in a 10 liter glass reactor, and a solution made from 10 g of gelatin, 16 g of disodium hydrogen phosphate dodecahydrate, and 0.73 g of resorcinol in 320 g of deionized water was added and thoroughly mixed. The temperature of the mixture was controlled to 25° C. Then, with stirring, a mixture made from 3200 g of microencapsulated monomer droplets with a narrow particle size distribution and made from 3.6% by weight of divinylbenzene and 0.9% by weight of ethylstyrene (used in the form of a commercially available isomer mixture of divinylbenzene and ethylstyrene in 80% of divinylbenzene), 0.5% by weight of dibenzoyl peroxide, 56.2% by weight of styrene, and 38.8% by weight of isododecane (industrial isomer mixture with a high proportion of pentamethylheptane), wherein the microcapsules were composed of a formaldehyde-hardened complex coacervate made from gelatin and from a copolymer of acrylamide and acrylic acid, was introduced and 3200 g of aqueous phase with a pH of 12 was added. The average particle size of the monomer droplets was 460 μm.

The mix was polymerized to completion, with stirring, by increasing the temperature according to a temperature program starting at 25° C. and finishing at 95° C. The mix was cooled, washed using a 32 μm screen, and then dried in vacuo at 80° C. This gave 1893 g of a spherical polymer with an average particle size of 440 μm, narrow particle size distribution, and a smooth surface. The polymer had a chalky white appearance from above and had a bulk density of about 370 g/l.

1b) Preparation of the Amidomethylated Bead Polymer 2373 g of dichloroethane, 705 g of phthalimide, and 505 g of 29.2% strength by weight formalin were placed in a vessel at room temperature. The pH of the suspension was adjusted to from 5.5 to 6 using aqueous sodium hydroxide. The water was then removed by distillation. 51.7 g of sulfuric acid were then metered in and the resultant water was removed by distillation. The mix was cooled. 189 g of 65% strength oleum were metered in at 30° C., followed by 371.4 g of monodisperse bead polymer prepared according to process step a) of Example 1. The suspension was heated to 70° C. and stirred for a further 6 hours at this temperature. The reaction liquid was drawn off, deionized water was metered in, and residual dichloroethane was removed by distillation.

Yield of amidomethylated bead polymer: 2140 ml
Composition by elemental analysis:
carbon: 75.3% by weight;
hydrogen: 4.9% by weight;
nitrogen: 5.8% by weight;
remainder oxygen.

1c) Preparation of the Aminomethylated Bead Polymer 1019 g of 45% strength by weight aqueous sodium hydroxide and 406 ml of deionized water were metered at room temperature into 2100 ml of amidomethylated bead polymer. The suspension was heated to 180° C. and stirred for 6 hours at this temperature.

The resultant bead polymer was washed with deionized water.
Yield of aminomethylated bead polymer: 1770 ml
The overall yield (extrapolated) was 1804 ml.
Composition by elemental analysis:
nitrogen: 11.75% by weight.

From the composition of the aminomethylated bead polymer by elemental analysis, it could be calculated that on statistical average per aromatic ring—stemming from the styrene and divinylbenzene units—1.17 hydrogen atoms had been substituted by aminomethyl groups.

1d) Preparation of the Monodisperse Resin Having Thiourea Groups
Starting Materials 1132 ml of deionized water were placed in a 4 liter autoclave at room temperature. 1700 ml of aminomethylated bead polymer from step c), 470 g of 30% strength by weight hydrochloric acid, and 485 g of thiourea were metered into the autoclave.

The suspension was stirred for 30 minutes at room temperature. The autoclave was then heated to 145° C. over a period of 2 hours. The mixture was stirred at 145° C. for a further 15 hours. Work-up of the mix:

The mix was cooled and the pressure released. The supernatant liquor was drawn off. The resultant bead polymer was washed with 4% strength by weight aqueous sodium hydroxide and finally with deionized water.
Yield: 1652 ml
Elemental analyses:
Nitrogen: 10.4% by weight
Sulfur: 10.2% by weight Example 2

Removal of mercury from aqueous solutions comprising sodium chloride using macroporous, monodisperse bead polymers containing thiourea groups 2a) 100 ml of macroporous, monodisperse bead polymer prepared as in Example 1 and containing thiourea groups were placed in a glass column. The glass columns were heated to 60° C. internal temperature. 1000 ml per hour of an aqueous sodium chloride solution with the following composition were passed through the column over the resin: 300 g of sodium chloride per liter of saline solution and 20 mg of mercury per liter of saline solution. The saline solution was adjusted to a pH of 9.2 using aqueous sodium hydroxide and controlled to 60° C.

The amount of mercury in the eluate was determined. Once 785 liters of saline solution had passed through the column over the resin, analysis gave 2 mg of mercury per liter of eluate. The resin had adsorbed a total of 154 g of mercury.

2b) In a comparative experiment 100 ml of macroporous, heterodisperse bead polymer containing thiourea groups and prepared as in DE-A 2,429,944 were placed in a glass column and treated with saline solution under the conditions described in Example 2a). Once 625 liters of saline solution had passed through the column over the resin, analysis gave 2 mg of mercury per liter of eluate. The resin had adsorbed a total of 124 g of mercury.

Example 2 shows that the novel macroporous, monodisperse bead polymers containing thiourea groups are markedly superior in their adsorption of mercury from an aqueous sodium chloride solution to a heterodisperse bead polymer as disclosed in DE-A 2,429,944.

The preparation of the macroporous heterodisperse bead polymers according to DE-A-2,429,944 is carried out by block or suspension polymerization of the corresponding mono- and polyvinyl compounds in the presence of solvents or high-molecular-weight substances.

For the preparation of macroporous base polymers DE-A-2,429,944 refers to J. Seidel et al. in Adv. Polym. Sci., Vol. 5, 1967, pp. 113 ff.

Preferred monovinylaromatic compounds are styrene, vinyltoluene and vinylnaphthalene, preferred polyvinyl compounds are divinylbenzene and trivinylbenzene.

For technical reasons, technical-grade divinylbenzene, which contains 40–50% by weight of ethylstyrene, is frequently employed instead of pure divinylbenzene.

Other suitable macroporous base polymers are those which, in addition to the above-mentioned mono- and polyvinyl compounds, contain 30 further vinyl compounds, such as, for example, methacrylic and acrylic compounds—in particular acrylonitrile—, ethylene, propylene, isobutylene, vinyl chloride, vinyl acetate, vinylidene chloride, vinylpyridine and substituted vinylpyridines, as well as vinylquinolines and vinylpyrrolidone.

The amount of polyvinyl compounds present in the macroporous base polymer can vary within broad limits. In general, the content of polyvinyl compounds is from about 1 to 50% by weight, based on the total amount of monomer, a content of from 2 to 30% by weight being preferred. The vinyl compounds referred to above as additives are likewise generally employed in amounts of from 1 to 50% by weight, based on the total amount of monomer, amounts of from 2 to 15% by weight being preferred.

Particularly suitable are macroporous base polymers which consist of from 50% to 98% of styrene, vinyltoluene, vinylanisole or ethylstyrene and from 50% to 2% of divinylbenzene or trivinylbenzene, preference being given to macroporous base polymers comprising from 85% to 98% of styrene and from 1.5 to 2% of divinylbenzene.

If the macroporous base polymer does not already contain primary and/or secondary amino groups through the use of corresponding monovinylaromatic compounds, for example p-vinylbenzylamine, these are introduced into the base polymer in a manner known per se. The introduction of these amino groups into the base polymer is known; for example, reference may be made here to the introduction of such groups by the method of chloromethylation and subsequent amination (U.S. Pat. No. 2,629,710).

In addition, it is possible to suspend the macroporous base polymer containing amino groups directly with the relevant salt of thiocyanic acid or optionally substituted thiourea in a suspension medium, and to heat the suspension with stirring.

The reaction time depends essentially on the reaction temperature and the nature of the base polymer employed.

The amount of thiocyanic acid, salts of thiocyanic acid, mustard oils or optionally substituted thioureas employed can vary within broad limits. Thus, it is possible to work with equimolar amounts of thiocyanic acid, salts of thiocyanic acid, mustard oils or optionally substituted thioureas, based on the amount of amino groups present in the base polymer, just as it is possible to employ an excess of thiocyanic acid, thiocyanates, thioureas or mustard oils, such as, for example, a 15-fold excess. In general, however, amounts of 1–2 mol of thiocyanic acid, thiocyanate, optionally substituted thioureas or mustard oils will be used per mole of amino groups present in the base polymer. In addition, it is likewise possible to work with a substoichiometric amount of thiocyanic acid, thiocyanate, optionally substituted thiourea or mustard oil.

The temperature at which the reaction is carried out is essentially dependent on the nature and structure of the macroporous base polymer containing primary and/or secondary amino groups. Thus, lower temperatures are generally sufficient in the case of macroporous base polymers containing primary aromatic amino groups than in the case of base polymers containing primary araliphatic amino groups. In general, temperatures of between 80 and 200° C. are used, temperatures of from 100 to 180° C. being preferred.

Suitable suspension media are liquids or mixtures of liquids which are inert towards the reaction participants under the reaction conditions, for example water, methanol, ethanol, toluene, chlorobenzene and mixtures of organic liquids, such as, for example, ethanol/toluene or toluene/chlorobenzene.

Example 3

Removal of mercury from aqueous hydrochloric acid using macroporous, monodisperse bead polymers containing thiourea groups 3a) 50 ml of the macroporous, monodisperse bead polymer prepared as in Example 1 and containing thiourea groups was placed in a glass column. 500 ml per hour of 10% strength by weight aqueous hydrochloric acid comprising 26 mg of mercury per liter were passed at room temperature through the column. The residual amount of mercury in the eluate was analyzed. Once 180 liters of hydrochloric acid had passed through the column, the amount of mercury per liter of eluate was determined as 2 mg. The resin had adsorbed a total of 92.8 g of mercury per liter of resin.

3b) In a comparative experiment, 50 ml of macroporous, heterodisperse bead polymer containing thiourea groups and prepared as in DE-A 2,429,944 were placed in a glass column and treated with 10% strength by weight hydrochloric acid under the conditions of Example 3a). Once 134 liters of 10% strength by weight hydrochloric acid had passed through the column, analysis gave the amount of mercury per liter of eluate as 2 mg. The resin had adsorbed a total of 68.9 g of mercury per liter of resin.

Even in the case of acid solutions the novel monodisperse bead polymers containing thiourea groups are markedly superior in the adsorption of mercury to a heterodisperse bead polymer as disclosed in DE-A 2,429,944.

Examples 2 and 3 show that the novel bead polymers have not only higher volume throughput in liters but also higher mercury adsorption up to the point at which 2 mg of mercury were measured per liter of eluate. These values cannot be achieved using heterodisperse bead polymers containing thiourea groups according to the prior art in DE-A 2,429,944 and EP-A 422,480.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing monodisperse, crosslinked bead polymers having thiourea groups comprising (a) reacting monomer droplets made from at least one monovinylaromatic compound and at least one polyvinylaromatic compound to give a monodisperse, crosslinked bead polymer, (b) amidomethylating the monodisperse, crosslinked bead polymer from step (a) with phthalimide or methylphthalimide, (c) converting the amidomethylated bead polymer from step (b) to an aminomethylated bead polymer, and (d) reacting the aminomethylated bead polymer from step (c) with thiourea, with substituted thiourea, or with salts of thiocyanic acid.

2. A process according to claim 1 wherein the monomer droplets are microencapsulated using a complex coacervate.

3. A process according to claim 1 wherein step (a) is carried out in the presence of a protective colloid.

4. A process according to claim 1 wherein step (a) is carried out in the presence of at least one initiator.

5. A process according to claim 1 wherein the monomer droplets comprise porogens that, after the polymerization, form macroporous, crosslinked bead polymers.

6. A process according to claim 1 wherein a polymerization inhibitor is used in step (a).

7. A process according to claim 3 wherein the protective colloids are gelatin, starch, polyvinyl alcohol, polyvinylpyrrolidone, polyacrylic acid, polymethacrylic acid, copolymers made from (meth)acrylic acid or (meth)acrylate, or mixtures thereof.

8. A process according to claim 1 wherein the monovinylaromatic compounds are monoethylenically unsaturated compounds.

9. A process according to claim 1 wherein the polyvinylaromatic compounds are divinylbenzene, divinyltoluene, trivinylbenzene, divinyinaphthalene, trivinyinaphthalene, 1,7-octadiene, 1,5-hexadiene, ethylene glycol dimethacrylate, trimethylolpropane trimethacrylate, allyl methacrylate, or mixtures thereof.

10. A process according to claim 1 wherein the initiator is a peroxy compound or an azo compound.

11. A process according to claim 10 wherein the initiator is dibenzoyl peroxide, dilauroyl peroxide, bis-(p-chlorobenzoyl) peroxide, dicyclohexyl peroxydicarbonate, tert-butyl peroctoate, tert-butyl peroxy-2-ethyl-hexanoate, 2,5-bis-(2-ethylhexanoylperoxy)-2,5-dimethylhexane, or tert-amylperoxy-2-ethylhexane.

12. A process according to claim 10 wherein the initiator is 2,2'-azobis(isobutyronitrile) or 2,2'-azobis-(2-methylisobutyronitrile).

13. A process according to claim 1 wherein a phthalimido ether is formed in step (b).

14. A process according to claim 13 wherein the phthalimido ether is prepared from phthalimide or methylphthalimide and formalin.

15. A process according to claim 13 wherein the reaction of the phthalimido ether with the bead polymer takes place in the presence of oleum, sulfuric acid, or sulfur trioxide.

* * * * *